(12) United States Patent
Sidabras

(10) Patent No.: US 12,103,041 B2
(45) Date of Patent: Oct. 1, 2024

(54) PORTABLE SCREENING AND STOCKPILING APPARATUS

(71) Applicant: McGRATH ENGINEERING LIMITED, Dungannon (GB)

(72) Inventor: Ramunas Sidabras, Carrickmore (GB)

(73) Assignee: McGrath Engineering Limited (GB)

( * ) Notice: Subject to any disclaimer, the term of this patent is extended or adjusted under 35 U.S.C. 154(b) by 0 days.

(21) Appl. No.: 18/377,100

(22) Filed: Oct. 5, 2023

(65) Prior Publication Data
US 2024/0116079 A1 Apr. 11, 2024

(30) Foreign Application Priority Data
Oct. 11, 2022 (EP) .................................. 22200922

(51) Int. Cl.
*B07B 1/00* (2006.01)
*B65G 41/00* (2006.01)

(52) U.S. Cl.
CPC ............ *B07B 1/005* (2013.01); *B65G 41/001* (2013.01); *B07B 2201/04* (2013.01)

(58) Field of Classification Search
CPC .... B07B 1/005; B07B 2201/04; B65G 41/001
See application file for complete search history.

(56) References Cited

U.S. PATENT DOCUMENTS

| | | | | |
|---|---|---|---|---|
| 5,248,042 A | * | 9/1993 | Kuhmonen | B07B 1/524 209/393 |
| 7,882,958 B2 | * | 2/2011 | Doppstadt | B07B 9/00 209/244 |
| 8,505,738 B2 | * | 8/2013 | O'Keeffe | B07B 1/46 209/421 |
| 11,511,319 B2 | * | 11/2022 | Mcdevitt | B07B 13/16 |

(Continued)

FOREIGN PATENT DOCUMENTS

| | | |
|---|---|---|
| GB | 2459898 A | 11/2009 |
| GB | 2468966 A | 9/2010 |

(Continued)

*Primary Examiner* — Joseph C Rodriguez

(57) ABSTRACT

The present invention relates to a portable screening and stockpiling apparatus comprising a tracked chassis; a feed system mounted to the chassis for accepting material to be screened; means for moving the feed system upwards from a substantially horizontal transport position with respect to the chassis to an inclined working position at an angle to the chassis and from the inclined position downwards to the substantially horizontal position; a screen box supported on the chassis for accepting material from the feed system, wherein the screen box comprises a first deck for screening any material fed thereinto, whereby material of relatively finer and coarser fractions is adapted respectively to pass through the first deck and across the top of the first deck, a first folding conveyor mounted on the chassis beneath the screen box and feed system to receive fines material passing through the deck of the screen box and to convey same away from a first end of the apparatus; and a second folding (Continued)

conveyor mounted on the chassis and associated with the screen box to receive the coarser material from the top of the deck and to convey same away from a second, opposing end of the apparatus.

9 Claims, 10 Drawing Sheets

(56) References Cited

U.S. PATENT DOCUMENTS

| | | | |
|---|---|---|---|
| 11,858,004 B2* | 1/2024 | Leinonen | B07B 1/005 |
| 2003/0173265 A1* | 9/2003 | Cohen | B07B 1/005 209/241 |
| 2005/0263626 A1* | 12/2005 | Brock | B65G 41/008 241/30 |
| 2016/0228919 A1* | 8/2016 | Vallelly | B07B 1/005 |
| 2019/0283083 A1* | 9/2019 | Rafferty | B07B 13/16 |
| 2021/0069750 A1* | 3/2021 | McDevitt | B07B 13/16 |
| 2021/0101181 A1* | 4/2021 | Belosevic | B07B 1/005 |
| 2022/0288640 A1* | 9/2022 | Rafferty | B07B 1/155 |
| 2023/0039373 A1* | 2/2023 | Leinonen | B07B 13/16 |

FOREIGN PATENT DOCUMENTS

| | | |
|---|---|---|
| WO | 9741971 A1 | 11/1997 |
| WO | 2022194776 A1 | 9/2022 |

* cited by examiner

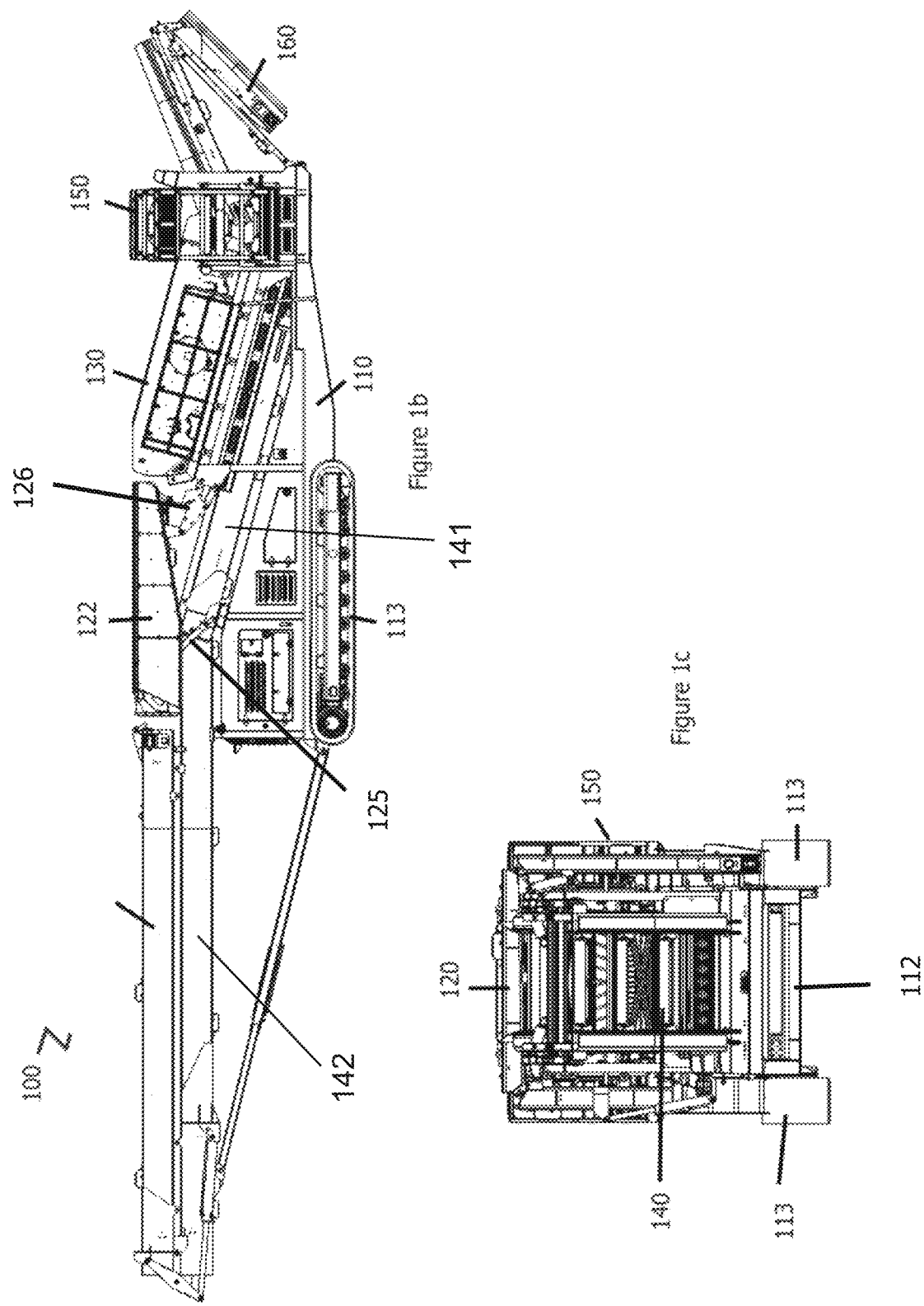

PORTABLE SCREENING AND STOCKPILING APPARATUS

The present invention relates generally to material handling equipment, in particular to portable equipment for screening and stockpiling feed material such as quarrying, recycling, mining, construction and demolition aggregates, and top soil into different size fractions, preferably fine, midsize, and oversize fractions.

BACKGROUND TO THE INVENTION

In a typical crusher line, mobile scalping screens are used to separate feed into different grades of product such as aggregates as well as other organic material with the aim of scalping away the oversized material for crushing. Most applications involving fines, i.e., any material having a size in the range up to approximately 10 mm, have a need for a large fines stockpile as the fines fraction is generally greater than each of the oversize and midsize fractions. However, conventional scalping screens are typically only capable of generating fines stockpiles with a height of about 3 m. Currently, no single machine can offer a stockpile height greater than 4.25 m. Therefore, in order to create a fines stockpile with a greater height than 4.25 m, a separate mobile stockpiling conveyor is required to be driven on site and used in connection with the conventional screening machine.

It is a therefore an object of the present invention to provide a single machine which overcomes the drawbacks of known solutions and separates and stockpiles feed material into different sized fractions, wherein the stockpile of the finest grade fraction may have a height of over 4.25 m.

SUMMARY OF THE INVENTION

The present invention relates to a tracked screener with a fines stockpiler mounted directly to the chassis below the feeding and screening area and capable of creating a fines stockpile with a height of over 4.25 m, preferably wherein the fines stockpile height is greater than 9.00 m, e.g. 9.904 m.

Accordingly, a first aspect of the present invention is a portable screening and stockpiling apparatus comprising:
 a tracked chassis;
 a feed system mounted to the chassis for accepting material to be screened;
 means for moving the feed system upwards from a substantially horizontal transport position with respect to the chassis to an inclined working position at an angle to the chassis and from the inclined position downwards to the substantially horizontal position;
 a screen box supported on the chassis for accepting material from the feed system, wherein the screen box comprises a first deck for screening any material fed thereinto, whereby material of relatively finer and coarser fractions is adapted respectively to pass through the first deck and across the top of the first deck;
 a first folding conveyor mounted on the chassis beneath the screen box and feed system to receive the finer material passing through the first deck of the screen box and to convey same away from a first end of the apparatus; and
 a second folding conveyor mounted on the chassis and associated with the screen box to receive the coarser material from the top of the first deck and to convey same away from a second, opposing end of the apparatus.

The apparatus according to the invention reduces the need for two machines when screening and stockpiling materials into different fractions, e.g., when separating fines material from coarser grade material. This is due to the fact that all fines material falls from the screen box directly onto the first folding conveyor and can be stacked without a separate, additional stacker conveyor and without the need for a transfer conveyor. This in turn reduces the need for a second trailer and reduces fuel consumption and machine maintenance for the end user, making the portable screening and stockpiling apparatus according to the invention easier to transport, more suitable for smaller sites and more cost efficient than conventional solutions.

In a preferred embodiment, the feed system comprises a feeder conveyor and feeder extension cribs, preferably wherein the feeder extension cribs are pivotally mounted along both sides and one end of the feeder conveyor and adapted to be folded upwards to create a hopper above the feeder conveyor, the hopper having an open discharge end. In this embodiment the screen box is supported at the discharge end of the feeder system.

In a preferred embodiment, the feed system is mounted to the chassis via a subframe.

In a particularly preferred embodiment, the means for moving the feed system from a lowered transport position to a raised working position and from the inclined working position downwards to the substantially horizontal transport position comprises at least one lift unit for moving the end of the feed system nearest the screen box and at least one pivoting supporting leg for moving the end of the feed system at the end nearest the fines conveyor, wherein the or each lift unit preferably attaches the screen box end of the feed system to a subframe of the chassis and the or each leg attaches the end of the feed system to the chassis. Particularly preferably, the means for moving the feed system comprises two lift units and two pivoting supporting legs.

When screening and stockpiling materials, it may be desired to separate the feed material into three different fractions, i.e., fines, midsize and oversize fractions. By midsize material is meant material with a diameter in the range of from approximately 10 mm to approximately 10 cm and by oversize material is meant material with a diameter above approximately 10 cm. However, this is not to be considered limiting and fractions with materials of alternate sizes may be screened and separated by the screening apparatus according to the invention.

Thus, in a preferred embodiment, the first deck of the screen box is a top deck and the screen box further comprises a bottom deck for screening the material which passes through the top deck thereinto, whereby fines material and midsize material of relatively finer and coarser fractions is adapted respectively to pass through the bottom deck and across the top of the bottom deck; and the apparatus further comprises a third folding conveyor mounted on the chassis at one side of the apparatus and associated with the screen box to receive midsize material from the top of the bottom deck and to convey same away from the apparatus.

The portable screening and stockpiling apparatus according to the invention may be converted from a compact transport position to an expanded working position. When the apparatus is in the transport position, the first and second folding conveyors are each independently folded over themselves, the feed system is parallel to the chassis and preferably in line with the first folded conveyor and the inlet end of the screen box. If present, the optional third folding conveyor is folded over the apparatus. When the apparatus is in the working position, each conveyor is configured to carry bulk material along an elevating path from a low position to a higher position.

The first folding conveyor may also be referred to hereinafter as a fines conveyor. The second folding conveyor may also be referred to hereinafter as an oversize material conveyor. The third folding conveyor may also be referred to hereinafter as a midsize material conveyor.

By folding conveyor is meant that the conveyor preferably comprises two or more sections which pivot with respect to each other such that the conveyor may be folded over itself for storage, particularly preferably wherein the conveyor further comprises a fold linkage for powering this pivot action, i.e., for unfolding of the conveyor, folding of the conveyor, or both. For example, each folding conveyor preferably comprises at least a head section and a tail section and, when unfolded, is designed to carry material along an elevating path from a low position adjacent the tail section, to a higher position adjacent the head section.

In a preferred embodiment, the apparatus comprises a plurality of lift units for moving each of the folding conveyors independently and for moving the feed system with respect to the chassis.

Each lift unit independently is preferably mounted on the chassis of the apparatus.

The or each lift unit, whether for moving a conveyor or the feed system, may independently comprise a hydraulic lift unit. However, this is not to be considered limiting and other means of effecting movement such as an electric actuator, mechanical jack, etc. may be used in addition to or instead of a hydraulic lift unit. The or each hydraulic lift unit may independently comprise one or more hydraulic control banks having one or more levers that operate hydraulic cylinders in connection with components of the apparatus so as to fold and unfold or push and retract one or more components of the apparatus.

The fines conveyor is preferably mounted directly to the chassis, with a portion of the conveyor located below the feed system and screen box of the apparatus.

The fines conveyor may comprise a first end attached to the chassis beneath the screen box to receive the fines material passing through the screen box, e.g., to receive the fines material from the first deck, or if present, bottom deck, of the screen box, and a second end which, in use, protrudes from a first end of the chassis.

The fines conveyor preferably comprises three sections, wherein a first, tail section is located beneath the screen box and feed system and is fixed in an upwardly inclined position, a second, mid-section is pivotally attached to the first section and a third, head section is pivotally attached to the mid-section, the head section comprising a free end from which material is discharged.

In this embodiment, the head section and mid-section of the fines conveyor are connected to each other such that the head section can pivot with respect to the mid-section, preferably wherein the conveyor further comprises a head fold linkage for powering this pivot action, e.g., for unfolding and folding of the head section of the conveyor. Additionally, the tail section and mid-section of the folding conveyor are connected to each other such that the mid-section and unfolded head section together can pivot with respect to the tail section to adjust the height of the free end fines conveyor. Such raising and lowering of the free end of the fines conveyor is preferably achieved using a hydraulic telescopic leg mechanism, particularly preferably wherein one end of the leg is attached to the chassis and the other to the mid-section of the fines conveyor.

In a particularly preferred embodiment, the length of the head section of the fines conveyor is in the range of from about 6 m to about 12 m, e.g., approximately 8.932 m, the length of the tail section is in the range of from about 5 m to about 8 m, approximately 6.077 m and the length of the mid-section is in the range of from about 8 m to about 12 m, approximately 10.573 m. However, this is not to be considered limiting and shorter and longer lengths for each of the sections independently are considered to be included within the scope of the invention.

In a preferred embodiment wherein the total length of the fines conveyor is about 25 m long, the apparatus according to the invention is capable of stockpiling fines up to 9.904 m giving a stockpile capacity of 1,752 $cm^3$.

In the embodiment wherein the apparatus further comprises a midsize material conveyor, the midsize material conveyor is adapted to be mounted to either side of the apparatus depending on intended use and/or space on site. For example, if the machine is required to be located against a wall, the midsize material conveyor may be mounted on the side of the apparatus opposing the wall.

The midsize material conveyor may comprise a first end attached to the chassis and a second end which, in use, protrudes from the side of the chassis. The first end of the midsize material conveyor may be positioned on the side of the chassis to receive the midsize material from the first screen, i.e., from the top of the bottom deck, of the screen box. The midsize material conveyor may convey the midsize material away from the apparatus for further processing or stockpiling of the midsize material.

The oversize material conveyor may comprise a first end attached to the chassis and a second end which, in use, protrudes from the side of the chassis. The first end of the oversize material conveyor may be positioned at a second of the chassis to receive the oversize material from the first screen, i.e., from the top of the deck of the screen box. The oversize material conveyor may convey the oversize material away from the apparatus for further processing or stockpiling of the oversize material.

The screen box is preferably a 12-foot by 5-foot screenbox.

The screen box may be a double deck producing three products or a single deck producing two products.

The portable screening and stockpiling apparatus may further comprise a power unit such as an engine which supplies power for functioning of the apparatus.

In order to transform the portable screening and stockpiling apparatus from the transport mode to the working mode, the head section of the fines conveyor is first unfolded.

The feed system is then raised into working mode and preferably pinned in place before raising the fines conveyor such that the free end of the fines conveyor is at a preferred discharge height, preferably wherein a telescopic leg attached to the mid-section of the fines conveyor is extended using hydraulic rams. The oversize material conveyor and, if present, the midsize material conveyor are each unfolded and raised such that the free end thereof is at a preferred discharge height, preferably by extending a telescopic leg attached to the conveyor using hydraulic rams.

In order to transform the portable screening and stockpiling apparatus back into transport position, the oversize material conveyor and, if present, the midsize material conveyor are each lowered and folded back, then fines conveyor is lowered and then the feed system is lowered. Finally, the fines conveyor is then folded over itself.

Accordingly, a second aspect of the present invention is a method for transforming the portable screening and stockpiling apparatus as described herein from a compact transport position to an expanded working position, the method comprising the following steps:
unfolding the fines conveyor such that it extends horizontally from the first end of the apparatus;
raising the feed system from the lower horizontal transport position parallel to the fines conveyor to the higher inclined position wherein the discharge end of the feed system is higher than the opposing end thereof;
raising the first folding conveyor to a desired stockpiling height;
unfolding the second folding conveyor such that it extends away from the second end of the apparatus and optionally
unfolding a third folding conveyor, if present, such that it extends away from the side of the apparatus.

The steps above may be performed in the opposite order for converting the apparatus described herein from an unfolded, working position to a folded, transport position.

BRIEF DESCRIPTION OF THE DRAWINGS

Certain preferred embodiments of the present invention will now be described, by way of example only, with reference to the accompanying drawings in which:

FIG. 1b shows a side view of the apparatus of FIG. 1a;

FIG. 1c shows an end view of the apparatus of FIG. 1a;

DETAILED DESCRIPTION

Figure 1A:
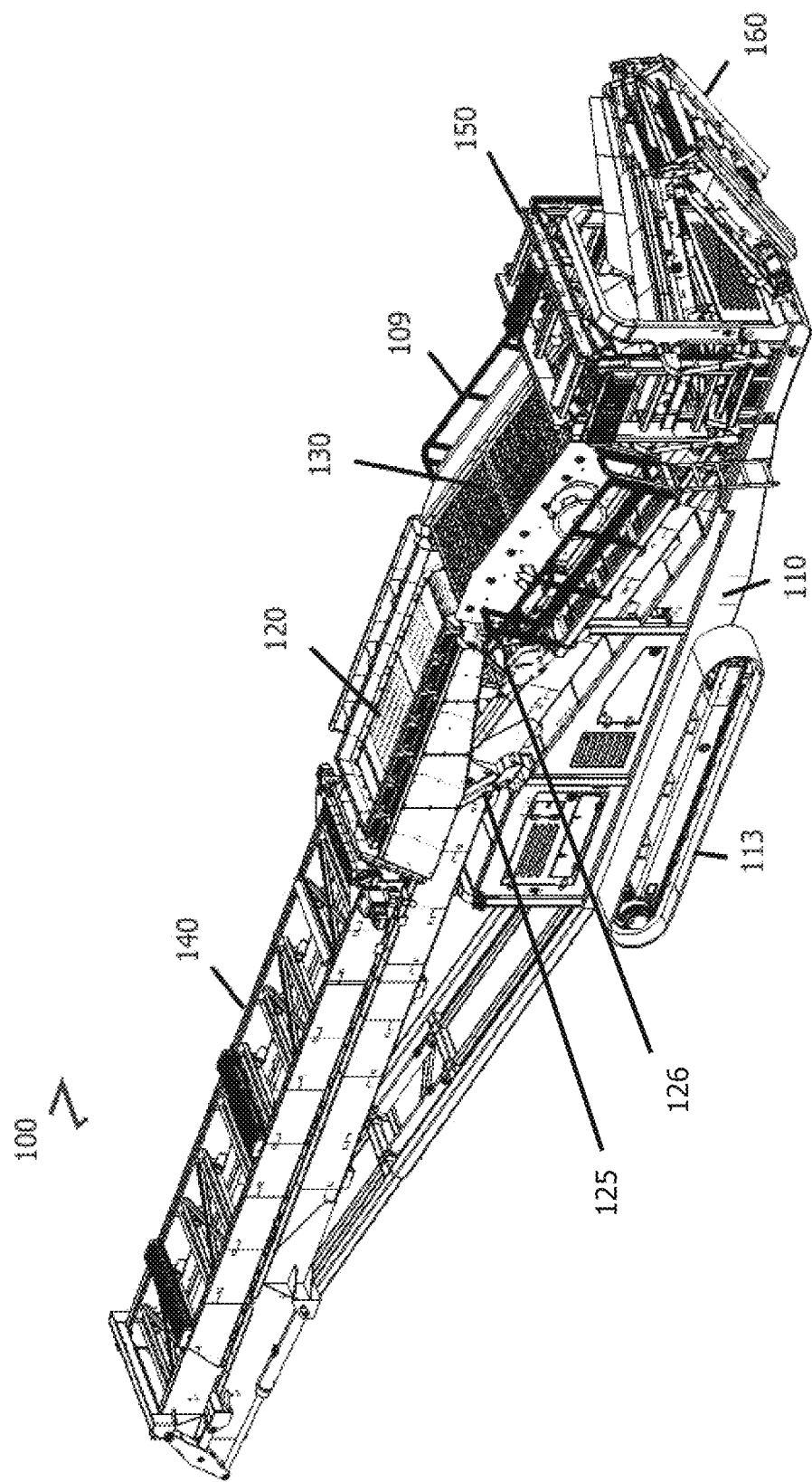
FIG. 1a shows a perspective view of a preferred embodiment of a portable screening and stockpiling apparatus according to the invention in transport mode.

Various embodiments of the present invention will be described in detail with reference to the drawings, where like reference numerals represent like parts and assemblies throughout the several views.

Referring to the drawings, FIGS. 1a to 1c show a preferred portable screening and stockpiling apparatus according to the invention, generally referred to herein by reference numeral 100, in transport mode. Mobile screen 100 is provided with a chassis 110. Chassis 110 has a first end 111 at the front of machine 100 and a second end 112 at the rear thereof. A continuous track system is located at first end 111 of chassis 110, continuous track system having a pair of driven, parallel tracks 113.

Apparatus 100 is further provided with feed system 120, screen box 130, fines stockpiler 140, midsize material conveyor 150 and an oversize material conveyor 160. Optional walkway 109 is provided either side of screen box 130 for the inspection of screen box 130 and access thereto for example for maintenance.

Feeder belt 121 of feed system 120 is partially surrounded by hinged feeder extension cribs 122. The cribs may be folded upwards to create three-sided hopper 123 with an open discharge end 124 adjacent screen box 130.

Feed system 120 is mounted to apparatus 100 on legs 125, 126.

Legs 125 are each hydraulic lift units and are located at either side of feed system 120 towards the rear end thereof. Legs 125 are adapted to pivot for raising the rear of feed system 120 upwards and forwards from the transport position to working mode.

Legs 126 are located at either side of feed system 120 towards the discharge end and are adapted to straighten from a bent transport position as shown in FIGS. 1a, 1b, 1c and 2 to a straight working position as shown in FIGS. 3 to 6, so as to raise the discharge end of feed system 120 upwards and forwards from the transport position to working mode.

Screen box 130 is located adjacent feed system 120 and accepts material from feed conveyor 121. As shown in the preferred embodiment depicted by the Figures, screen box 130 is a three-way double deck 12 ft by 5 ft (3.658 m×1.524 m) vibrating screen box. That is, screen box 130 preferably has two decks, a first, top deck 131 with apertures of a first size, e.g., in the range of from 25 mm to 50 mm and a second, lower bottom deck (not shown) with apertures of a second, smaller size, e.g., in the range of from 5 mm to 20 mm, such that the bottom deck is in the form of a mesh.

Top deck 131 preferably comprises a 3 mesh or punch plate system, i.e., having three apertures per linear inch (25.4 mm), with a preferred total top deck size of 3770 mm×1524 mm.

Additionally, or alternatively, the bottom deck preferably comprises a 2 mesh or punch plate system, i.e., having three apertures per linear inch (25.4 mm), with a preferred total bottom deck size of 3697 mm×1524 mm.

The preferred height of screen box 130 is 1088 mm.

Fines stockpiler 140 is preferably 80 ft (24.384 m) long and 48 in (1.219 m) wide and is mounted directly to chassis 110 at first end 111. Fines stockpiler 140 comprises three sections: a first, tail section 141 located beneath the screen box and feed system fixed in an upwardly inclined position, a second, mid-section 142 pivotally attached to the first section and a third, head section 143 pivotally attached to the mid-section, the head section comprising a free end from which material may be discharged as shown in FIG. 7b.

Midsize material conveyor 150 may be mounted directly to chassis 110 on either the left- or right-hand side of mobile screen 100 adjacent second end 112. Midsize material conveyor 150 preferably comprises four sections totalling 8543 mm, wherein the conveyor belt length from centre to centre of the drums (not shown) is preferably 8265 mm and the width is preferably 800 mm.

Oversize conveyor 160 is mounted directly to chassis 110 at second end 112. Oversize conveyor 160 preferably comprises two sections totalling 5753 mm, wherein the conveyor belt length from centre to centre of the drums (not shown) is preferably 5445 mm and the width is preferably 1200 mm.

Figure 7A:
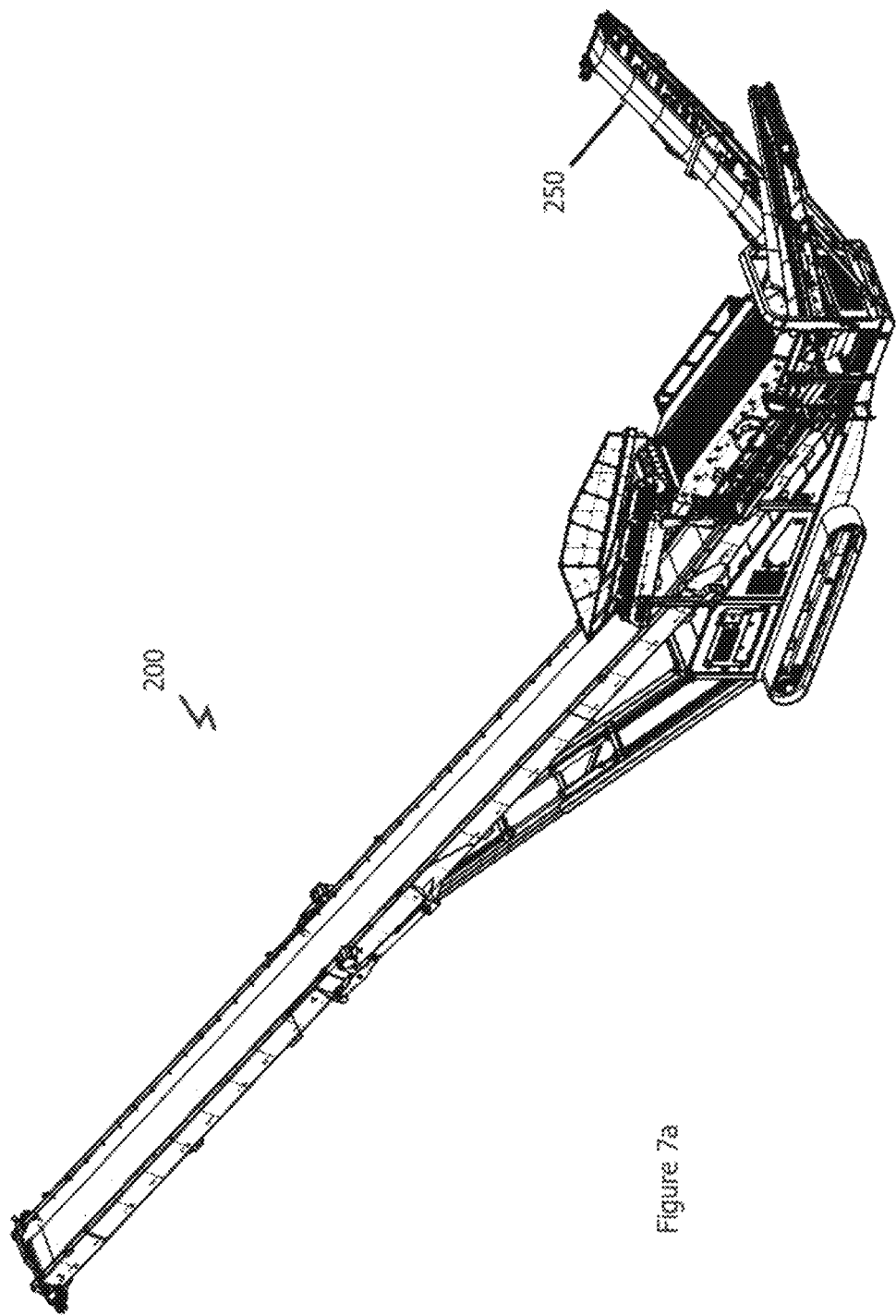
FIG. 7a shows a perspective view of an alternative portable screening and stockpiling apparatus of FIG. 1a in working mode with the midsize conveyor on the opposite side.
Figure 7B:
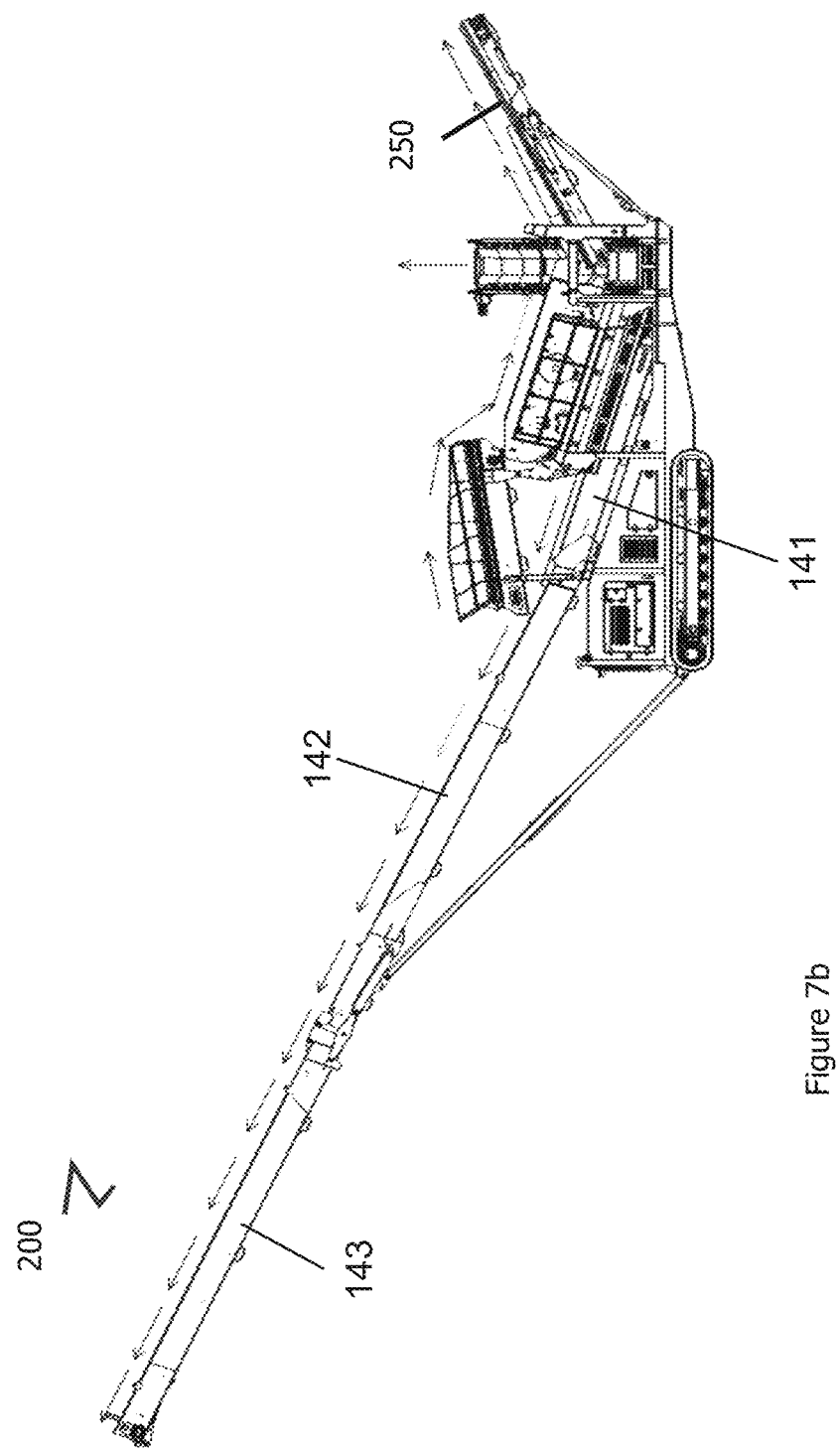
FIG. 7b shows a side view of the portable screening and stockpiling apparatus of FIG. 7a with arrows indicating the direction of material flow during use of the apparatus.
Figure 7C:
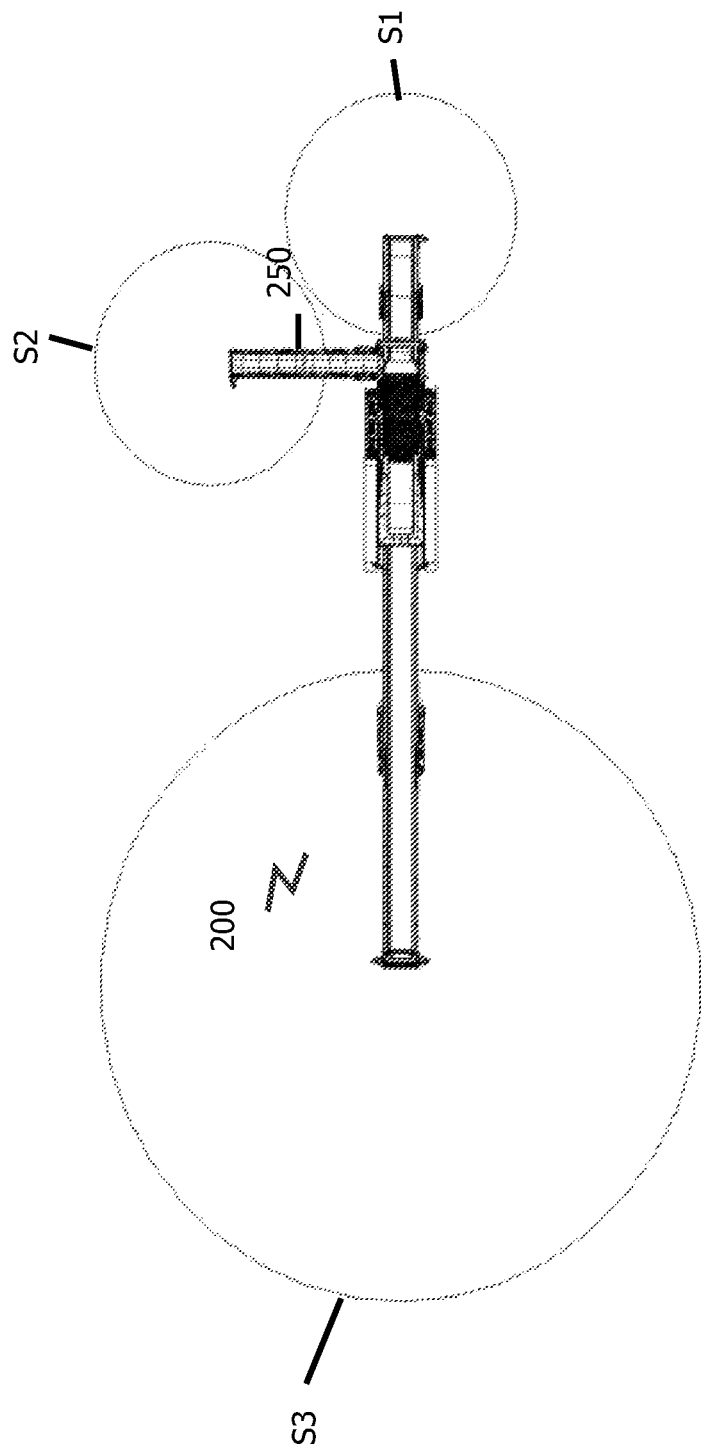
FIG. 7c shows a plan view of the portable screening and stockpiling apparatus of FIG. 7a with stockpiles created by the apparatus.

Referring to FIGS. 7a to 7c, an alternative preferred portable screening and stockpiling apparatus according to the invention is shown, generally referred to herein by reference numeral 200. Apparatus 200 is identical to apparatus 100 but for the fact that midsize material conveyor 250 is on the opposite side of the machine.

Referring to FIGS. 2 to 6, the steps required to convert the portable screening and stockpiling apparatus according to the invention from transport to working mode are now described based on apparatus 100. Such steps apply equally to apparatus 200.

Figure 2:
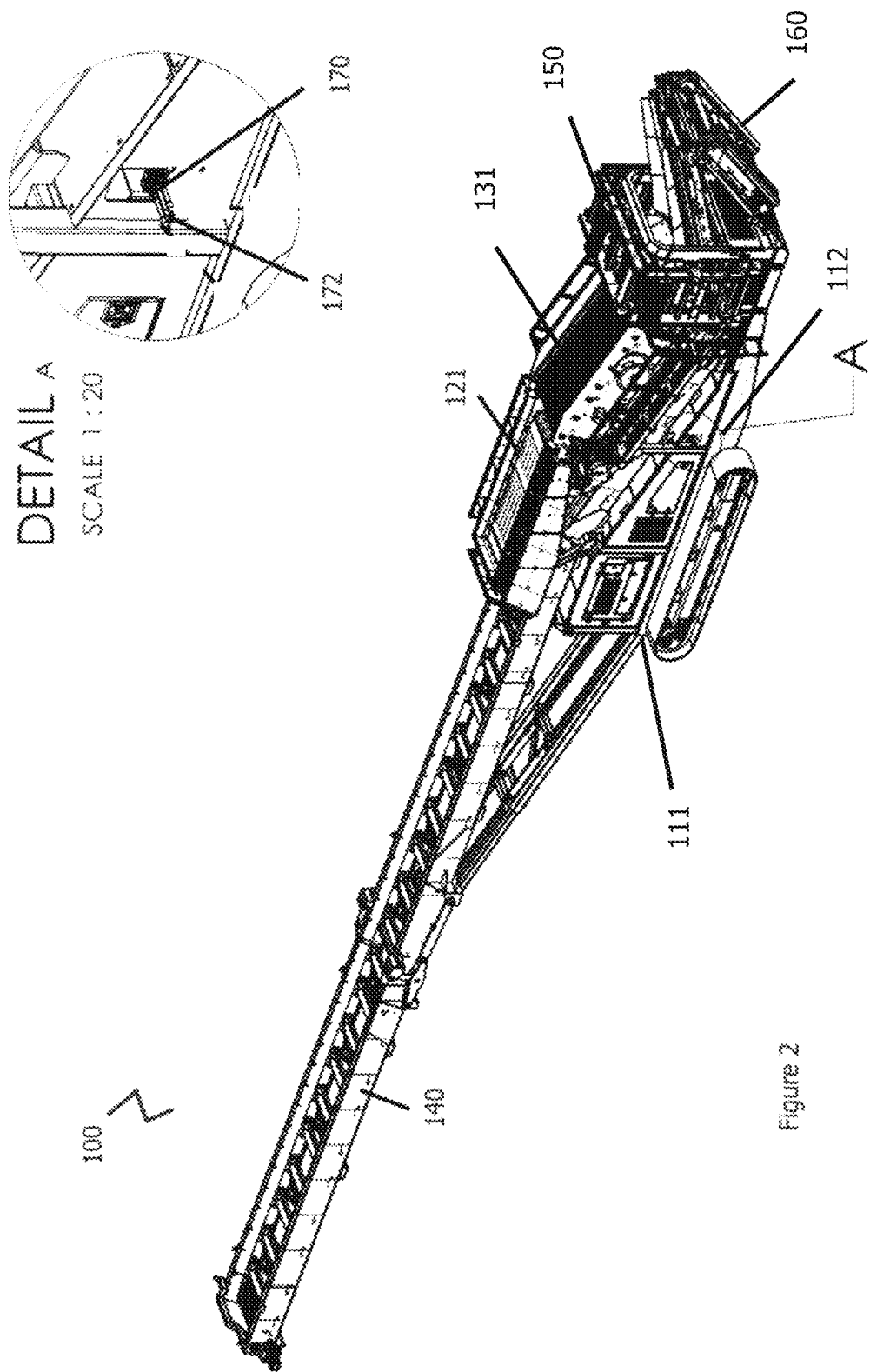
FIG. 2 shows a perspective view of the apparatus shown in FIG. 1a with the fines conveyor unfolded.

Firstly, as shown in FIG. 2, fines conveyor 140 is unfolded using hydraulic lever 172 on control bank 170.

Figure 3:
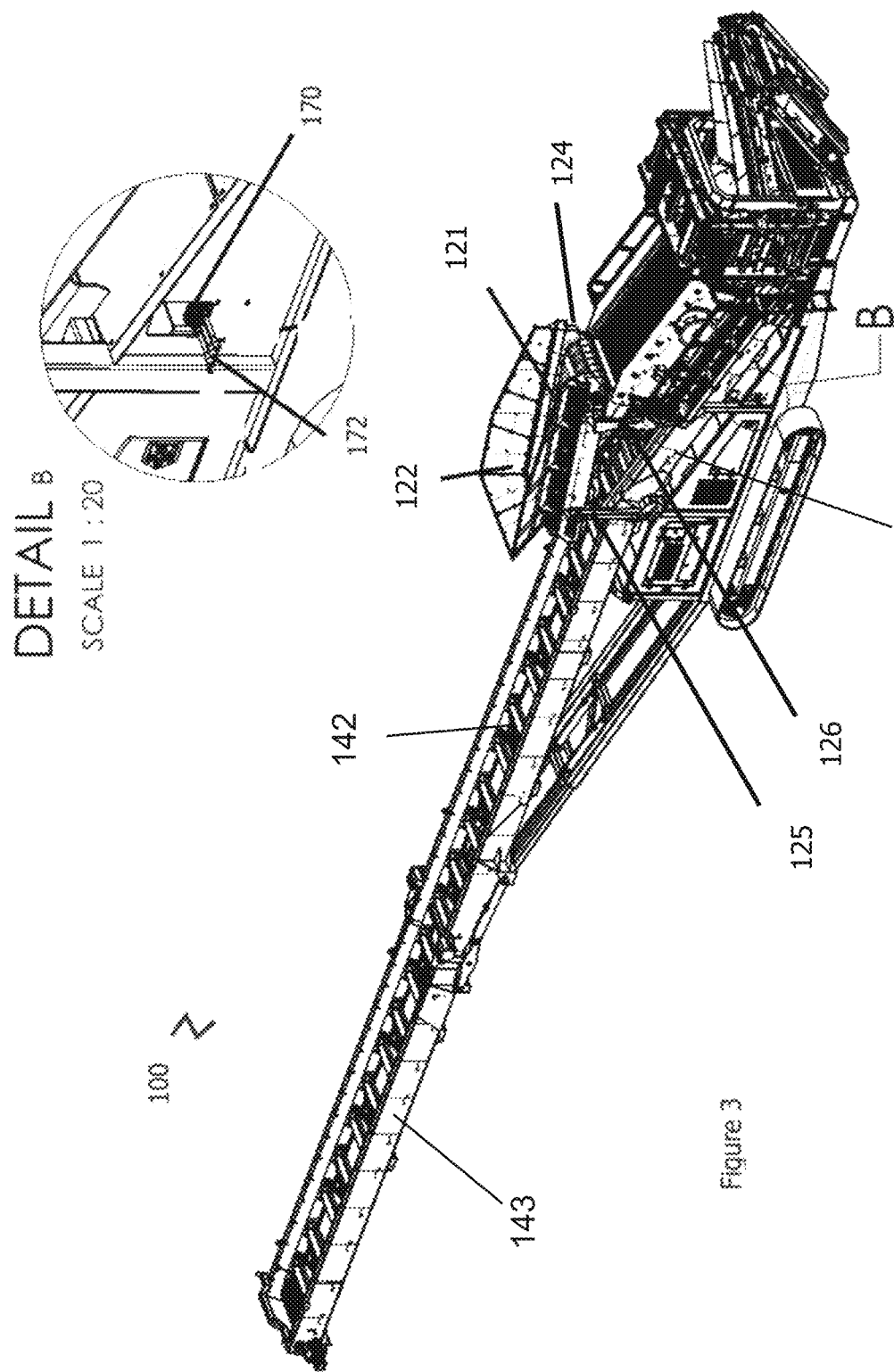
FIG. 3 shows a perspective view of the apparatus of FIG. 2 with the feeder lifted.

Next, in order to move feed system 120, as shown in FIG. 3, feed conveyor 121 is raised up using hydraulic lever 173 on control bank 170 which directs oil to rams at legs 125, thus pushing the rod of the ram outwards and in turn moving the linkage in leg 125 in an upwards direction. As this linkage rises upwards, legs 126 also move upwards.

Once feed system 120 is in working position, the oil to the ram is stopped by releasing the hydraulic lever back into a neutral position and pins are preferably placed into the linkage to hold the desired working position of feed system 120. Feeder extension cribs 122 of feed system 120 are then manually folded upwards to create hopper 123 with discharge end 124.

Figure 4:
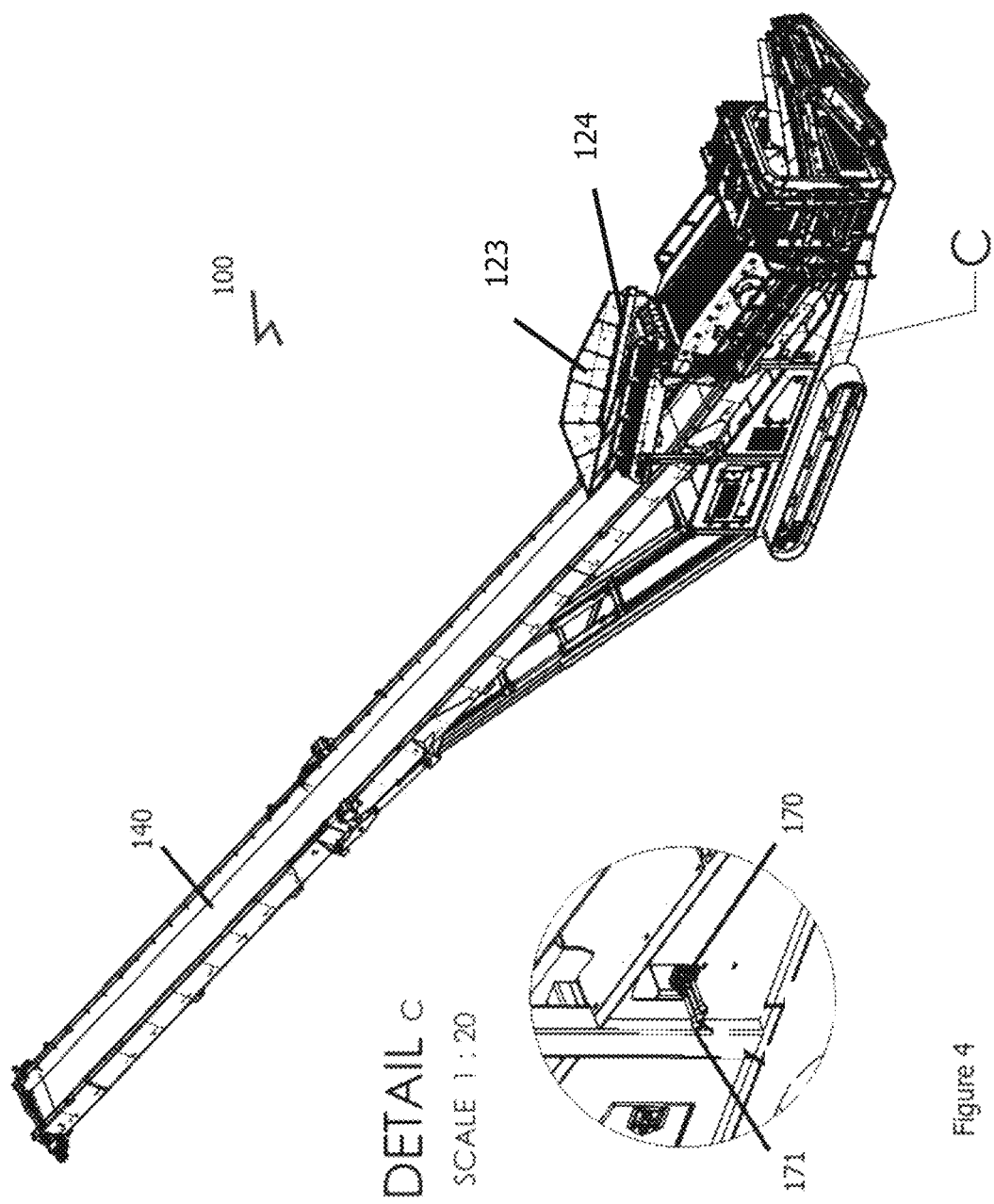
FIG. 4 shows a perspective view of the apparatus of FIG. 3 with the fines conveyor raised.

As shown in FIG. 4, fines conveyor 140 is subsequently raised to the desired stockpile height using lever 171 on control bank 170.

Figure 5:
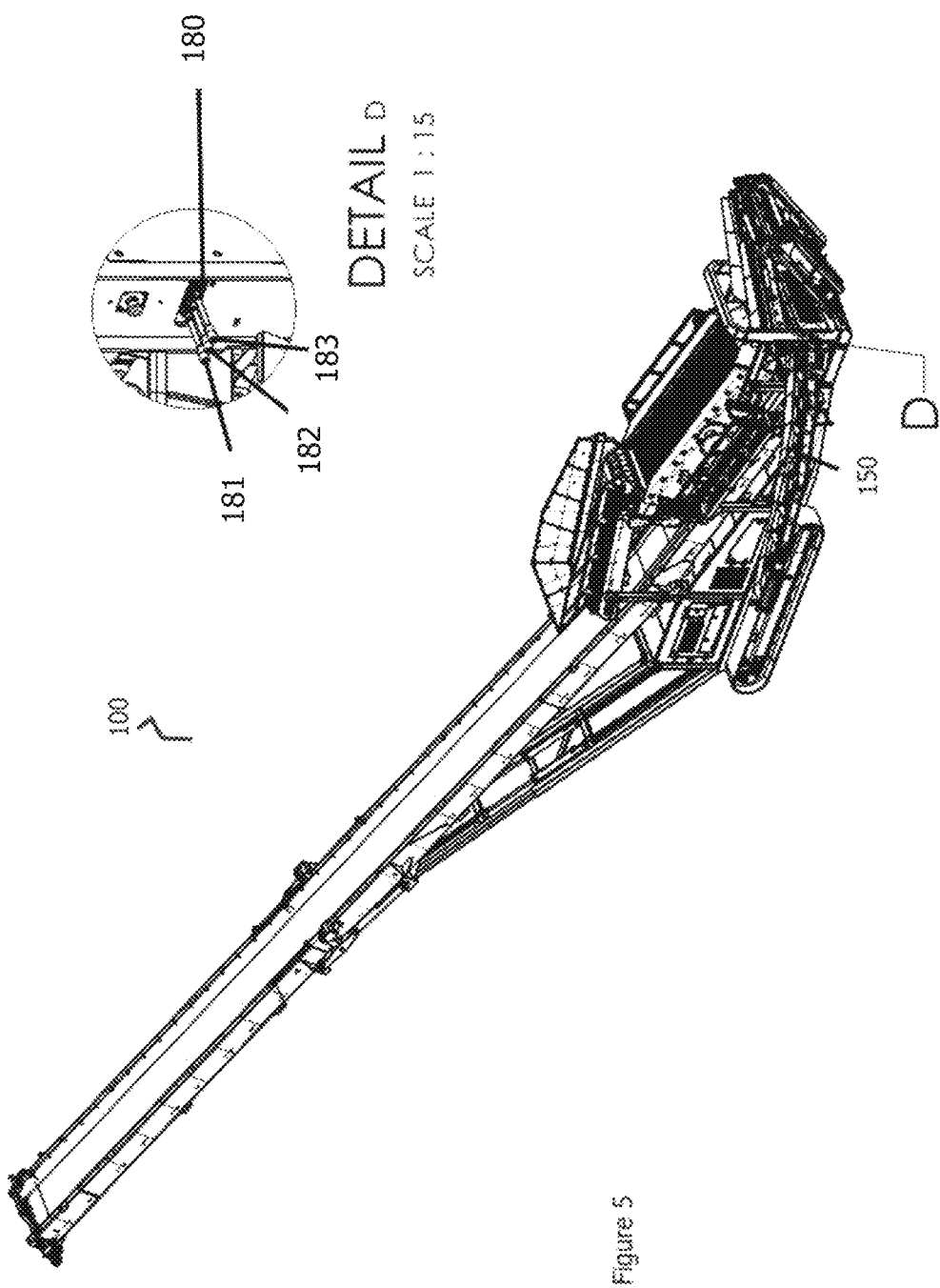
FIG. 5 shows a perspective view of the apparatus of FIG. 4 with the fines conveyor raised and the midsize material conveyor unfolded.

As shown in FIG. 5, midsize material conveyor 150 is unfolded using levers 181, 182, 183 on control bank 180.

Figure 6:
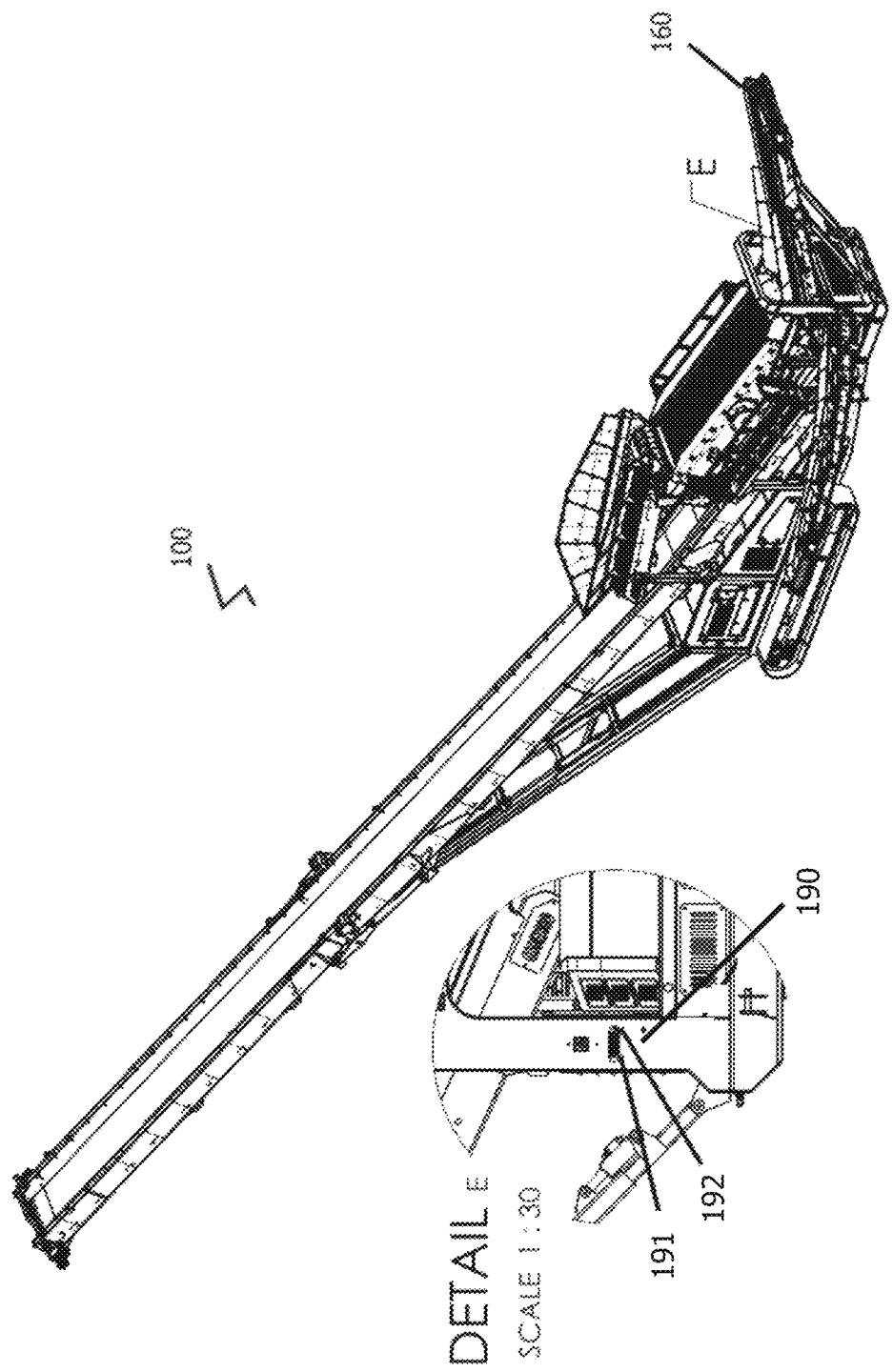
FIG. 6 shows a perspective view of the apparatus of FIG. 5 with the fines conveyor raised, the midsize and oversize material conveyors unfolded.

Finally, as shown in FIG. 6, oversize material conveyor 160 is unfolded using levers 191, 192 on control bank 190.

In use of apparatus 100 and 200 in working mode, material to be screened (not shown) is fed onto apparatus 100, 200 by a loading shovel or other machine (not shown) into the feeding area within the hopper created by cribs 122 above feeder belt 121. Feeder belt 121 then feeds onto the top deck (not shown) of screen box 130. Top deck 131 of screen box 130 has apertures of a greater size than those of the bottom deck resulting in smaller material (fines and midsize material) falling through top deck 131 onto the bottom deck. Material bigger than the top deck aperture size moves over top deck 131 and falls onto oversize material conveyor 160. This oversize material is then transferred via oversize material conveyor 160 to create a stockpile S1 at the back of apparatus 100, 200. With an oversize material conveyor having a belt length from of about 5 m and width of 1.2 m, the maximum height of stockpile S1 is 4.084 m, with a volume of 106 cm$^3$.

The material that falls onto the bottom deck and is bigger than the size of the apertures in the bottom deck moves over the top of the bottom deck onto midsize material conveyor 150, 250. The midsize material moves along midsize material conveyor 150, 250 away from apparatus 100 to create a stockpile S2 towards the side of apparatus 100, 200 on which midsize material conveyor 150, 250 is mounted. With a midsize material conveyor having a belt that is 8 m long from centre of drum to centre of drum and 800 mm wide, the maximum height of stockpile S2 is 3.974 m, with a volume of 104 cm$^3$.

The material that falls onto the bottom deck and is smaller than the size of the apertures in the bottom deck mesh falls onto fines conveyor belt 130. This fines material moves along fines conveyor 140 away from apparatus 100, 200 to create a stockpile S3 at the front of the machine. With a fines conveyor 80 ft (24.384 m) long and 48 in (1.219 m) wide, the maximum height of stockpile S3 is 9.904 m, with a volume of 1,752 cm$^3$.

The material flow from feed system 120 through screen box 130 and along conveyors 140, 250, 160 of apparatus 200 is shown by the arrows in FIG. 7b.

It is to be understood that the invention is not limited to the specific details described herein which are given by way of example only and that various modifications and alterations are possible without departing from the scope of the invention as defined in the appended claims.

The invention claimed is:

1. A portable screening and stockpiling apparatus comprising:
    a tracked chassis
    a feed system mounted to the chassis for accepting material to be screened;
    means for moving the feed system upwards from a substantially horizontal transport position with respect to the chassis to an inclined working position at an angle to the chassis and from the inclined position downwards to the substantially horizontal position;
    a screen box supported on the chassis for accepting material from the feed system, wherein the screen box comprises a first deck for screening any material fed thereinto, whereby material of relatively finer and coarser fractions is adapted respectively to pass through the first deck and across the top of the first deck,
    a first folding conveyor mounted on the chassis beneath the screen box and feed system to receive fines material passing through the first deck of the screen box and to convey same away from a first end of the apparatus; and
    a second folding conveyor mounted on the chassis and associated with the screen box to receive the coarser material from the top of the first deck and to convey same away from a second, opposing end of the apparatus;
    wherein the first folding conveyor comprises a tail section located beneath the screen box and feed system, a mid-section pivotally attached to the tail section and a head section pivotally attached to the mid-section, the head section comprising a free end from which material is discharged,
    wherein the feed system is located between the screen box and the head section free end.

2. The portable screening and stockpiling apparatus as claimed in claim 1, wherein the first deck is a top deck and the screen box further comprises a bottom deck for screening the material which passes through the first deck thereinto, whereby fines material and midsize material of relatively finer and coarser fractions is adapted respectively to pass through the bottom deck and across the top of the bottom deck; and the apparatus further comprises a third folding conveyor mounted on the chassis at one side of the apparatus and associated with the screen box to receive midsize material from the top of the bottom deck and to convey same away from the apparatus.

3. The portable screening and stockpiling apparatus as claimed in claim 1, wherein the feed system comprises a feeder conveyor and feeder extension cribs.

4. The portable screening and stockpiling apparatus as claimed in claim 1, wherein the means for moving the feed system from a lowered transport position to a raised working position and from the inclined working position downwards to the substantially horizontal transport position comprises at least one lift unit for moving the end of the feed system nearest the screen box and at least one pivoting supporting leg for moving the end of the feed system at the end nearest the fines conveyor.

5. The portable screening and stockpiling apparatus as claimed in claim 1, wherein the apparatus comprises a plurality of lift units for moving each of the folding conveyors independently and for moving the feed system with respect to the chassis.

6. The portable screening and stockpiling apparatus as claimed in claim 1, wherein the first folding conveyor is mounted directly to the chassis, with a portion of the conveyor located below the feed system and screen box of the apparatus.

7. The portable screening and stockpiling apparatus as claimed in claim 1, wherein the tail section is fixed in an upwardly inclined position.

8. A method for transforming the portable screening and stockpiling apparatus as claimed in claim 1 from a compact transport position to an expanded working position, the method comprising the following steps:

unfolding the first folding conveyor such that it extends horizontally from a first end of the apparatus;

raising the feed system from the lower horizontal transport position parallel to the first folding conveyor to the higher inclined position wherein the discharge end of the feed system is higher than the opposing end thereof;

raising the first folding conveyor to a desired stockpiling height;

unfolding the second folding conveyor such that it extends away from the second end of the apparatus; and optionally unfolding a third folding conveyor, if present, such that it extends away from the side of the apparatus.

9. The portable screening and stockpiling apparatus as claimed in claim 3, wherein the feeder extension cribs are pivotally mounted along both sides and one end of the feeder conveyor and adapted to be folded upwards to create a hopper above the feeder conveyor, the hopper having an open discharge end.

* * * * *